(12) United States Patent
Natario (10) Patent No.: US 12,151,815 B2
(45) Date of Patent: Nov. 26, 2024

(54) SUSPENDED SERVING SYSTEM AND METHODS

(71) Applicant: The Boeing Company, Arlington, VA (US)

(72) Inventor: Scott M. Natario, Kent, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/344,771

(22) Filed: Jun. 29, 2023

(65) Prior Publication Data

US 2023/0348061 A1 Nov. 2, 2023

Related U.S. Application Data

(62) Division of application No. 16/201,933, filed on Nov. 27, 2018.

(51) Int. Cl.
*B64D 11/00* (2006.01)

(52) U.S. Cl.
CPC .............................. *B64D 11/0007* (2013.01)

(58) Field of Classification Search
CPC ............ B64D 11/0007; B64D 11/0023; B64D 11/0697; B64D 2011/0084
See application file for complete search history.

(56) References Cited

U.S. PATENT DOCUMENTS

| | | | |
|---|---|---|---|
| 3,102,607 A * | 9/1963 | Roberts | B61D 37/00 186/40 |
| 3,558,086 A | 1/1971 | Kraly | |
| 3,999,630 A | 12/1976 | McPhee | |
| 5,205,515 A * | 4/1993 | Luria | B64D 11/0007 186/40 |
| 5,440,997 A | 8/1995 | Crowley | |
| 6,450,318 B1 | 9/2002 | Minardi | |
| 6,644,441 B1 | 11/2003 | Ebrahimi | |
| 6,988,078 B1 | 1/2006 | Heidenreich et al. | |
| 2004/0112691 A1 | 6/2004 | Lehmann et al. | |
| 2011/0128949 A1 | 6/2011 | Ezaki et al. | |
| 2013/0199402 A1 | 8/2013 | Ansar | |
| 2015/0014481 A1 | 1/2015 | Vandewall et al. | |
| 2015/0059363 A1 | 3/2015 | Burd et al. | |
| 2015/0122963 A1 | 5/2015 | Mochizuki et al. | |

(Continued)

FOREIGN PATENT DOCUMENTS

| | | |
|---|---|---|
| EP | 2549412 B1 | 3/2014 |
| KR | 20180002353 U | 8/2018 |
| WO | 2004078601 A2 | 9/2004 |

OTHER PUBLICATIONS

U.S. Patent and Trademark Office, Non-Final Office Action regarding U.S. Appl. No. 16/201,933, dated Mar. 17, 2021, 12 pages.

(Continued)

*Primary Examiner* — Philip J Bonzell
*Assistant Examiner* — Ashesh Dangol
(74) *Attorney, Agent, or Firm* — Kolisch Hartwell, P.C.

(57) ABSTRACT

An aircraft is disclosed, including a fuselage having a longitudinal axis and a passenger compartment having a floor and a ceiling. The aircraft further includes rows of seats fixed to the floor adjacent and aisle and a mobile container suspended from multiple tracks mounted on the ceiling over the aisle.

20 Claims, 6 Drawing Sheets

(56) References Cited

U.S. PATENT DOCUMENTS

2017/0101182 A1* 4/2017 Brown .............. B64D 11/0007
2017/0320580 A1 11/2017 Roth et al.
2018/0370634 A1 12/2018 Augustyniak

OTHER PUBLICATIONS

U.S. Patent and Trademark Office, Final Office Action regarding U.S. Appl. No. 16/201,933, dated Jul. 6, 2021, 11 pages.
U.S. Patent and Trademark Office, Non-Final Office Action regarding U.S. Appl. No. 16/201,933, dated Dec. 7, 2021, 12 pages.
U.S. Patent and Trademark Office, Final Office Action regarding U.S. Appl. No. 16/201,933, dated Apr. 8, 2022, 17 pages.
U.S. Patent and Trademark Office, Non-Final Office Action regarding U.S. Appl. No. 16/201,933, dated Aug. 2, 2022, 18 pages.
U.S. Patent and Trademark Office, Final Office Action regarding U.S. Appl. No. 16/201,933, dated Dec. 5, 2022, 11 pages.
U.S. Patent and Trademark Office, Final Office Action regarding U.S. Appl. No. 16/201,933, dated Feb. 15, 2023, 20 pages.
U.S. Patent and Trademark Office, Non-Final Office Action regarding U.S. Appl. No. 16/201,933, dated Aug. 8, 2023, 20 pages.
Tripadvisor, "Best side of plane to sit when taking off and landing", dated 2011, retrieved on Nov. 27, 2023, from the Internet: https://www.tripadvisor.com/ShowTopic-g32655-i61-k4925734-Best_side_of_plane_to_sit_when_taking_off_and_landing_Los_Angeles_California.html, 6 pages.
U.S. Patent and Trademark Office, Final Office Action regarding U.S. Appl. No. 16/201,933, dated Dec. 6, 2023, 25 pages.

* cited by examiner

FIG. 13

SUSPENDED SERVING SYSTEM AND METHODS

CROSS-REFERENCE

This application is a divisional application of U.S. patent application Ser. No. 16/201,933, filed Nov. 27, 2018. The complete disclosure of the above-identified patent application is hereby incorporated by reference for all purposes.

FIELD

This disclosure relates to systems and methods for serving vehicle passengers. More specifically, the disclosed examples relate to transporting service items through a passenger cabin.

INTRODUCTION

Beverage and meal service have long been standard on a majority of commercial flights. Cabin attendants push a heavy wheeled cart down the aisle between passenger seats, distributing service items such as food, beverages, headphones, and customs paperwork. To maximize cargo space, the cart occupies the full width of the aisle, temporarily obstructing the aisle. Once or more during a flight, the attendants slowly wheel the cart along the length of the cabin or seating section, attending to each row of passengers. During this period, passengers can experience restricted access to some areas of the cabin. For instance, passengers may be unable to access restrooms located at the front or rear of the cabin, or a passenger leaving their seat partway through service may be unable to return to their seat until service is concluded.

SUMMARY

The present disclosure provides systems, apparatuses, and methods relating to a suspended serving system. In some examples, an aircraft may include a fuselage having a longitudinal axis and a passenger compartment having a floor and a ceiling. The aircraft may further include rows of seats fixed to the floor adjacent an aisle, and a mobile container suspended from multiple tracks that are mounted on the ceiling over the aisle. In some examples, the mobile container may have a side portion extending over one or more of the seats.

In some examples, a method of delivering service items to rows of seats adjacent an aisle in a passenger compartment may include suspending a mobile container from multiple tracks mounted on a ceiling above the aisle of the passenger compartment. The method may further include moving the mobile container along the multiple tracks to deliver service items to selected rows of seats.

Features, functions, and advantages may be achieved independently in various examples of the present disclosure, or may be combined in yet other examples, further details of which can be seen with reference to the following description and drawings.

DETAILED DESCRIPTION

Various aspects and examples of a suspended serving system having dual tracks, as well as related methods, are described below and illustrated in the associated drawings. Unless otherwise specified, a suspended serving system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through F, each of which is labeled accordingly.

Overview

In general, a suspended serving system in accordance with the present teachings includes a container suspended from one or more tracks. The serving system can be mounted in a cabin of a vehicle that includes a plurality of seats (e.g., rows of seats) fixed to a floor, adjacent an aisle. For instance, the tracks of the serving system can be mounted on the ceiling of a passenger compartment (e.g., inside a fuselage of an aircraft). The container is movable along the tracks and can be used to transport service items down the aisle to occupants of the seats.

Figure 1:
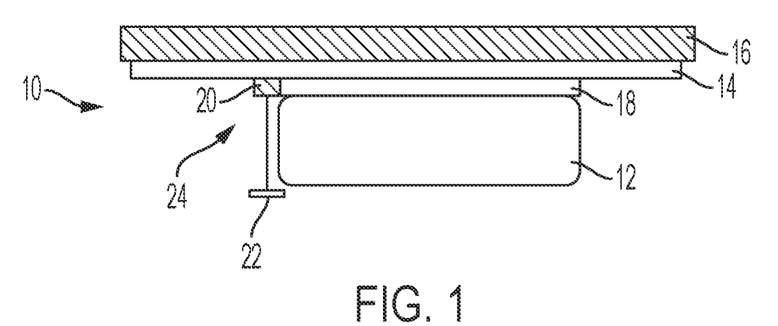
FIG. 1 is a schematic diagram of an illustrative suspended serving system in accordance with aspects of the present disclosure.

FIG. 1 is a schematic diagram of an illustrative suspended serving system 10, as viewed from the side. One or more tracks 14 are mounted to a ceiling 16 to support a mobile container 12. The container includes one or more engaging structures 18 that are configured to engage track system 14, support the container, and facilitate movement of the container along the track system. Container 12 further includes a brake mechanism and an actuator 22.

Track system 14 is configured to support the load of the container and any contents. Track system 14 distributes the load of container 12 laterally and longitudinally by sufficient distances to prevent swinging of the container in any direction. The track system may be described as anti-sway and/or stabilizing.

A track system including a pair of tracks may be desirable as simple and cost effective while both effectively distributing load and preventing lateral swinging and/or swaying of container 12 relative to a longitudinal extent of the tracks. A single track having a laterally elongate profile, and in some examples engaging multiple separate engaging structures 18 of container 12, can also be used to provide load distribution and swing prevention. Track system 14 can be mounted to ceiling 16 by any effective means, including but not limited to fastening, bonding, and/or forming as part of the ceiling during construction of the vehicle.

When track system 14 is mounted to the ceiling of a passenger compartment having rows of seats, the track system can be centered over and/or adjacent an aisle. Such a position may allow a user to access and/or propel container 12 while walking down the aisle. The track system may extend along a full length of the passenger compartment, along a seating section of the compartment, and/or along any portion of the passenger compartment where service is desired. Serving system 10 may further include additional containers 12 and track systems 14 for different areas of service. For example, first class, business, and economy sections may each be provided with a container 12 mounted on separate track systems 14.

Serving system 10 can be designed for a specific model and/or range of aircraft or vehicle. For example, track system 14 can be disposed on ceiling 16 such that other ceiling features such as overhead lighting or air vents are not impeded. The serving system may be particularly suited to modern aircraft in which recessed LED lighting and overseat air vents typically leave a clear expanse of ceiling over each aisle. For another example, container 12 can be shaped to occupy available space between and/or below a particular design of overhead bins.

Container 12 can be shaped to take advantage of space above the seats in a passenger compartment. For example, the container can include a side portion that extends over one or more seats adjacent an aisle. Container 12 can be sized and suspended such that a bottom wall of the side portion or of container 12 is disposed above the heads of any occupants of the seats. To maximize volume of the container while minimizing a possibility of the bottom wall extending lower than the height of a seat occupant, the container may be configured such that the bottom wall is disposed above seated head height for an occupant of selected height. For example, the $90^{th}$ or the $99^{th}$ percentile of height can be selected based on data from an authority such as the United States National Center for Health Statistics. For another example, a height can be selected based on accepted building, furniture, and/or vehicle industry design standards.

Container 12 can be comprised of a strong, lightweight material such as a composite. Laminates similar to those used for other elements of an aircraft interior may be particularly suited to provide strength with minimal weight. Decorative laminates may allow aesthetic design of the exterior of container 12, and/or inclusion of instructional and/or organizational labels in the interior of the container. Container 12 includes an outer envelope or shell and can further include interior structures and/or divisions. The interior of the container can be insulated, for instance to maintain temperatures of hot and cold service items. The interior of the container can be customized for efficient storage of a selected array of service items and/or integration of systems such as refrigeration, audio/visual, or credit card processing.

Container 12 can be configured for access from a front end and from a back end, relative to an aisle. For example, the container can include one or more doors or openings at each end. Providing dual-access may allow simultaneous use of serving system 10 by two users, which may in turn improve efficiency and speed of service. The container can include structures to allow different access modes. For example, container 12 can include a small access door for use during service and large access panel for loading prior to service. Such differentiated access may facilitate service in the confined space of an aisle while allowing quick and efficient preparation in the more open area of a galley.

Container 12 can be unitary or divisible. In other words, container 12 can include a single unit or can include multiple sub-units. In examples of container 12 that include multiple subunits, each subunit can be suspended from a separate track, pair of tracks, and/or track system. In such examples, each subunit can be separately moved along the corresponding track system and can include a brake mechanism 20 and actuator 22. Separately suspending and braking each subunit may provide each subunit with the same advantages of stability and safety. Subunits can also be configured for connection to one another. In such examples, the connected subunits can be selectively connected to move as a single unit and disconnected to move separately.

Container 12 can be manually moveable by a user and/or serving system 10 can include motorized elements or other mechanical biasing for power assist or autonomous movement of the container. In examples including motorized elements, brake mechanism can be controllable by an electronic actuator 22 such as a remote control device. Manual movement of the container may be preferable for reasons of cost and reduced maintenance. Simple mechanical mechanisms may be selected for serving system 10, to provide reliability and ease of use. Container 12 can be constructed of lightweight materials to allow ease of movement without power assist.

Figure 2:
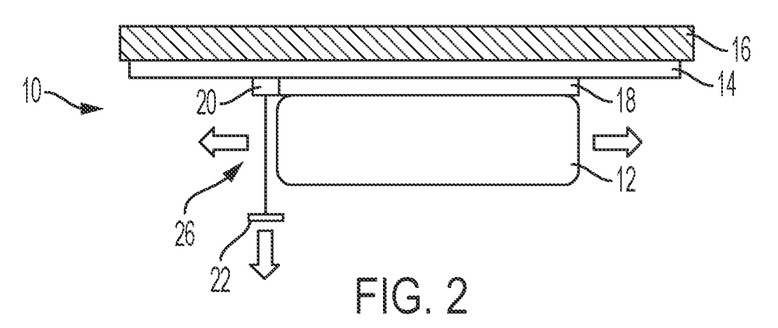
FIG. 2 is another schematic diagram of the serving system of FIG. 1, in a mobile configuration.

As shown in FIGS. 1 and 2, actuator 22 can be used to engage or disengage brake mechanism 20 and thereby transition container 12 between a fixed mode 24 and a mobile mode 26. Actuator 22 can be configured for manual transition between the fixed mode and the mobile mode. In FIGS. 1 and 2, actuator 22 is depicted as a handle engaged by a downward pull, but can include any effective mechanism or mechanisms. In fixed mode 24, shown in FIG. 1, container 12 is fixed in position relative to track system 14 and is not movable. In mobile mode 26, shown in FIG. 2, the container is freely movable in either direction along the track system. Container 12 can be configured to default to fixed mode 24. To achieve such a default, brake mechanism 20 can be configured to default to engagement when actuator 22 is not actuated, and actuator 22 can be configured to require active input. For example, actuator 22 can be a spring biased mechanism such as a momentary button.

Configuring container 12 to default to fixed mode 24 may improve safety for a user of serving system 10 and for occupants of nearby seats. Particularly in a vehicle environment where motion or change in orientation of the vehicle may result in movement of unrestrained cargo, such a default may prevent undesirable or unrestrained travel of container 12 along track system 14. Instead, container 12 can be restrained by brake mechanism 20 unless moved by a user of the serving system.

In contrast to wheeled carts typically used for cabin service, serving system 10 can secure container 12 against movement in both lateral and vertical directions. For instance, an aircraft rising or dropping sharply due to turbulence may exert downward or upward force on the container. Engagement between engaging structures 18 and track system 14 may prevent some or all movement of container 12 in response to such vertical forces and in particularly extreme situations that may result in liftoff of unrestrained cargo.

Track system 14, engaging structures 18, brake mechanism 20, and actuator 22 can include any mechanical, electrical, analog, and/or digital systems appropriate to desired functionality. For example, track system 14 can include plain box rails and engaging structures 18 can include nylon rollers similar to those used for sliding doors. Such common parts may reduce cost and failure modes, while allowing simple repairs. For another example, track system 14 and engaging structures 18 can include opposingly oriented permanent magnets to achieve electromagnetic suspension. Such a magnetic interface may limit friction, providing smooth movement and reducing need for maintenance. Examples of effective brake mechanisms 20 include, but are not limited to clamps, bead and detent or pin and aperture engagement, electromagnets or plate magnets, and cable brakes.

Actuator 22 can be configured to facilitate movement of container 12 and/or can be integrated into other features configured to facilitate movement. For example, actuator 22 can be a squeeze-bar mounted on an inner side of a handle of container 12. In such an example, a user may engage actuator 22 and disengage brake mechanism 20 when grasping the handle to push or pull container 12. Actuator 22 can also be part of an actuator system accessible at multiple locations on container 12. For example, a front end of the container and a rear end of the container can each include a handle with an integrated squeeze-bar actuator, allowing a user to move the container from either end.

Suspended serving system 10 can allow use of an aisle during service, with minimal or no disruption of service. For example, a passenger may duck under a unitary container 12 to proceed down the aisle. For another example, two subunits of a container 12 may be separated along their respective tracks to provide room for a passenger to slalom or zig-zag down the aisle between the subunits. Such unimpeded access during service may improve passenger experience by allowing passengers to move about the compartment and/or access restrooms during service. Additionally, crew may be able to more easily return to the galley for forgotten or specially requested items, and/or move about the compartment to perform tasks unrelated to service. Such use of the aisle may also be important during emergency situations, allowing passengers and crew unimpeded access to emergency exits and/or equipment.

Examples, Components, and Alternatives

The following sections describe selected aspects of exemplary suspended serving systems as well as related systems and/or methods. The examples in these sections are intended for illustration and should not be interpreted as limiting the entire scope of the present disclosure. Each section may include one or more distinct examples, and/or contextual or related information, function, and/or structure.

While an aircraft is used as an example implementation to facilitate understanding the disclosure, after reading the present disclosure it will be recognized the scope of the present disclosure is not limited by the example implementation and can be implemented in passenger or cargo compartments of other vehicles, including trains or trolleys, buses, ships, and spacecraft.

A. Illustrative Unitary Suspended Serving System

Figure 3:
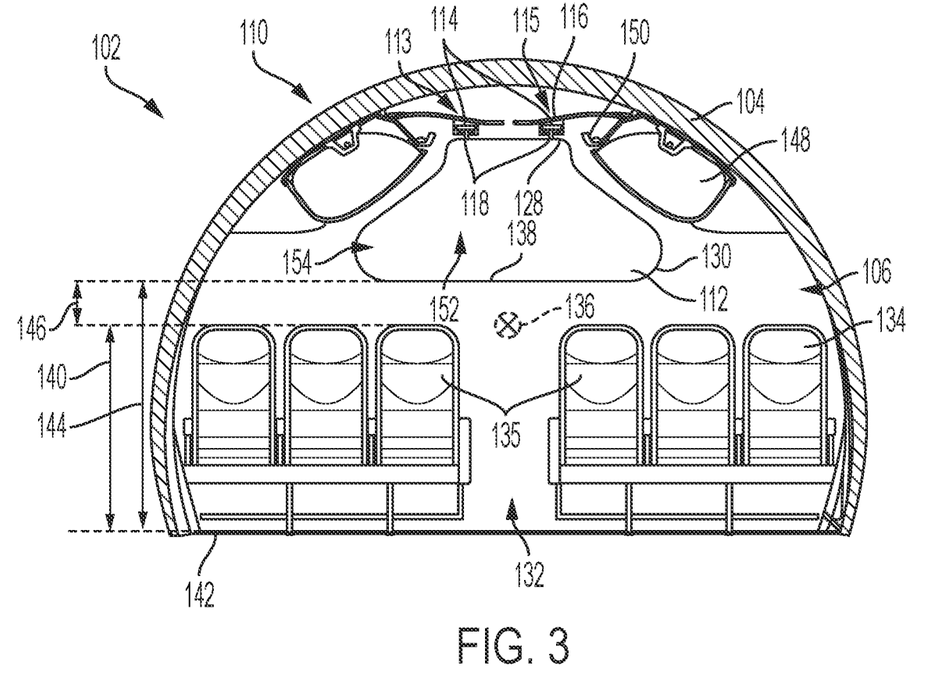
FIG. 3 is a cross-sectional view of an aircraft passenger compartment, including an illustrative suspended serving system.

As shown in FIG. 3, this section describes an illustrative suspended serving system 110. Serving system 110 is an example of serving system 10, described above, and is mounted in an aircraft 102. FIG. 3 is a cross-sectional view of a fuselage 104 of aircraft 102, showing the interior of a passenger compartment 106. Serving system 110 is mounted to a ceiling 116 of the passenger compartment. As can be seen in FIG. 3, serving system 110 takes advantage of cabin space that is typically underutilized or not used at all, while also providing improved passenger access and safety benefits.

Serving system 110 includes a container 112 suspended from a pair of tracks 114. The tracks are box rails, directly fastened to ceiling 116. Container 112 includes a pair of roller carriages 118, configured to be received in tracks 114. Each roller carriage 118 is coupled to an upper wall 128 of an outer envelope 130 of container 112. The container further includes a brake mechanism and an actuator, which are not shown. As discussed above, container 112 is transitionable between a fixed mode and a mobile mode, and defaults to the fixed mode.

Tracks 114 are fastened to ceiling 116 over an aisle 132, between rows of seats 134. The tracks extend along the aisle, parallel to a longitudinal axis 136 of fuselage 104. In the depicted example, each track is positioned immediately above an edge of a seat 134, with a center point between the tracks centered over aisle 132. As shown in FIG. 3, tracks 114 are mounted to separate locations on ceiling 116. A first of the tracks is fastened at a first location 113 on the ceiling, and the second of the tracks is fastened at a second location 115 on the ceiling. Tracks 114 can be positioned immediately above aisle 132, centered and/or symmetrical relative to the aisle, or at any point on ceiling 116 appropriate to dispose container 112 as desired. Roller carriages 118 can be coupled to container 112 such that upper wall 128 is below tracks 114 and clear of any descending features of ceiling 116.

Container 112 can be entirely disposed directly above aisle 132. In the depicted example, container 112 extends over both aisle 132 and those seats 135 of seats 134 that are adjacent the aisle. A central portion 152 of the container is disposed directly above aisle 132, and two side portions 154 extend laterally out from central portion 152, over adjacent seats 135.

Outer envelope 130 of the container includes a bottom wall 138. In the depicted example, bottom wall 138 is generally planar. Container 112 is sized, shaped, and suspended such that bottom wall 138 is disposed above adjacent seats 135. As shown in FIG. 3, seats 134 have a seat height 140, as measured from a floor 142 of passenger compartment 106. Bottom wall 138 defines a clearance height 144 of serving system 110. Bottom wall 138 and clearance height 144 are above seat height 140. The difference between clearance height 144 and seat height 140 may be described as head space 146.

Serving system 110 can be configured to allow sufficient head space 146 for any passenger. However, minimizing unneeded head space may allow a larger container 112, with greater storage capacity. Accordingly, serving system 110 can be configured to allow sufficient head space 146 for a selected range of passengers. For example, sufficient head space can be allowed for passengers up to the $90^{th}$ percentile of height. Passengers of greater height than the selected range may be invited to switch to a seat located further from aisle 132.

Container 112 is shaped to maximize storage capacity within the space available above clearance height 144. In the depicted example, container 112 is generally trapezoidal in shape, with an upper curve configured to provide clearance between the container and overhead bins 148 of passenger compartment 106. Container 112 can also be shaped to provide clearance from any features specific to a passenger compartment, such as recessed lighting 150 in the depicted example.

When container 112 is in mobile mode, as roller carriages 118 travel along tracks 114, the container travels along aisle 132 between overhead bins 148. Bottom wall 138 travels over head space 146, seats 134, and any passengers occupying the seats. Container 112 can be propelled along the aisle by a cabin attendant or other user. The container can be manually propelled and/or can include motorized elements for automatic movement. Passengers or attendants desiring to travel down aisle 132 past container 112 can duck under bottom wall 138 of the container.

B. Illustrative Divisible Suspended Serving System

Figure 4:
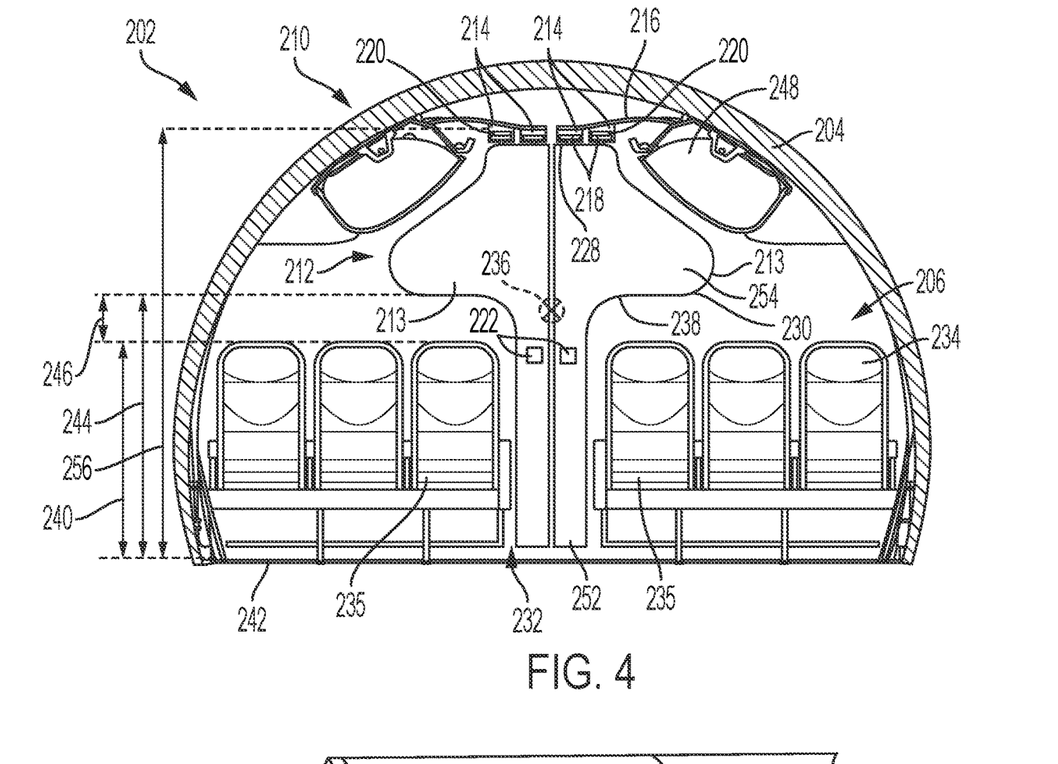
FIG. 4 is a cross-sectional view of another aircraft passenger compartment, including an illustrative dual-track suspended serving system.

As shown in FIGS. 4-6, and 8, this section describes an illustrative suspended serving system 210. Serving system 210 is an example of serving system 10, described above, and is mounted in an aircraft 202. FIG. 4 is a cross-sectional view of a fuselage 204 of aircraft 202, showing the interior of a passenger compartment 206. Serving system 210 is mounted to a ceiling 216 of the passenger compartment.

Serving system 210 includes a container 212 having two subunits 213. Each subunit is suspended from a pair of tracks 214, and independently movable along the pair of tracks. Both pairs of tracks 214 are fastened to ceiling 216 over an aisle 232, between rows of seats 234. The tracks extend along the aisle, parallel to a longitudinal axis 236 of fuselage 204. Each subunit 213 includes a main body portion 252 and a side portion 254. The side portion extends laterally out from main body portion 252, over an adjacent seat 235 of seats 234.

Tracks 14 are box rails, directly fastened to ceiling 216. Each subunit 213 includes a pair of roller carriages 218, configured to be received in the corresponding pair of tracks. Each roller carriage 218 is coupled to an upper wall 228 of an outer envelope 230 of the corresponding subunit 213. Each subunit further includes a brake mechanism 220 and an actuator 222.

In the depicted example, each pair of tracks 214 is positioned with one track immediately above an edge of an adjacent seat 235 and one track over aisle 232. Each subunit is thereby suspended over an adjacent seat 235 and half of aisle 232. Such positioning of tracks 214 and the suspended subunits may allow use of space available both in aisle 232 and overhead of occupants of the adjacent seats. Tracks 214 can be positioned immediately above aisle 232, centered and/or symmetrical relative to the aisle, or at any point on ceiling 216 appropriate to dispose container 212 and subunits 213 as desired. Roller carriages 218 can be coupled to each subunit 213 of container 212 such that upper walls 228 are below tracks 214 and clear of any descending features of ceiling 216.

Side portion 254 of each subunit 213 of the container includes a bottom wall 238. In the depicted example, bottom wall 238 is generally planar. Each subunit 213 is sized, shaped, and suspended such that bottom wall 238 is disposed above adjacent seats 235. As shown in FIG. 3, seats 234 have a seat height 240, as measured from a floor 242 of passenger compartment 206. Bottom wall 238 defines a clearance height 244 of serving system 210. Bottom wall 238 and clearance height 244 are above seat height 240. The difference between clearance height 244 and seat height 240 may be described as head space 246. Serving system 210 can be configured to allow sufficient head space 246 for any passenger. As discussed in reference to serving system 110 above, minimizing unneeded head space may allow greater storage capacity. Accordingly, serving system 210 can be configured to allow sufficient head space 246 for a selected range of passengers.

Main body portion 252 of each subunit 213 extends most of a distance 256 between ceiling 216 and floor 242. In other words, container 212 extends a majority of the height of passenger compartment 206. Each main body portion 252 extends down past bottom wall 238 of the corresponding side portion 254, into aisle 232. Together, main body portions 252 of subunits 213 occupy a majority of aisle 232. The main body portions 252 may alternatively or in combination with the example described above be sized differently to provide any desired distance between the ceiling 216 and floor 242. Other examples and configurations can be envisioned from the present disclosure and are intended to be within the scope of this disclosure.

Container 212 and subunits 213 are shaped to maximize storage capacity within the space available, both above clearance height 244 and in aisle 232. In the depicted example, side portion 254 of each subunit 213 includes an upper curve to provide clearance between the subunit and overhead bins 248 of passenger compartment 206. In the depicted example, main body portions 252 of subunits 213 are generally rectangular and sized to provide clearance from floor 242 and adjacent seats 235.

Subunits 213 of container 212 can be symmetrical or can be different shapes and/or designs. Each subunit can include different interior features appropriate to store selected service items. For example, one subunit 213 can include a refrigeration unit for storage of beverages while the other subunit includes a heating system for storage of meals. The separate outer envelopes 230 of subunits 213 may provide advantageous insulation between hot and cold storage.

Figure 5:
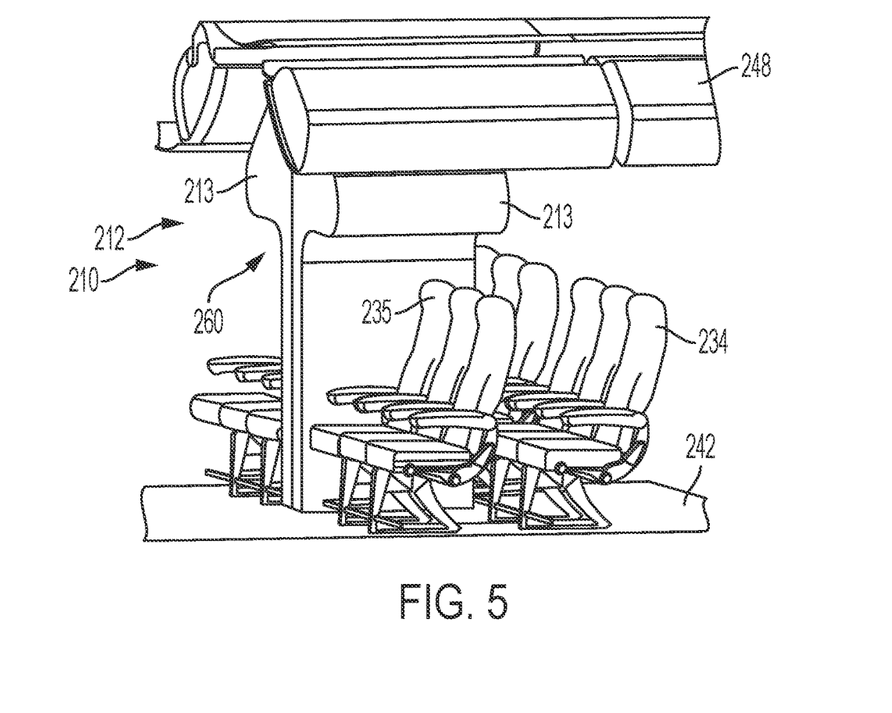
FIG. 5 is an isometric view of the passenger compartment of FIG. 4, with the serving system in a joined configuration.
Figure 6:
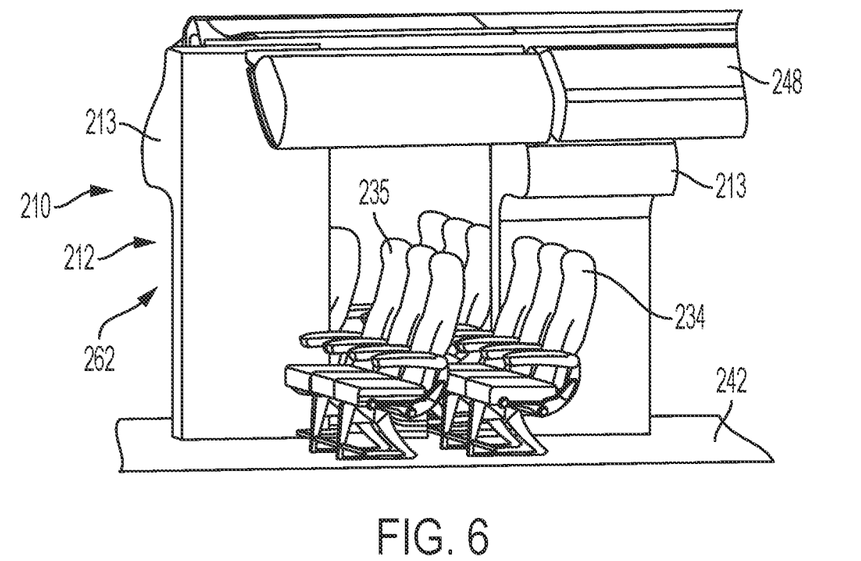
FIG. 6 is an isometric view of the passenger compartment of FIG. 4, with the serving system in a separated configuration.

FIGS. 5 and 6 are isometric views of serving system 210 with subunits 213 in a joined configuration 260 and a separated configuration 262, respectively. Container 212 can be configured to move along tracks 214 with subunits 213 in joined configuration 260 and to selectively transition to separated configuration 262. Container 212 can be separated to allow walking access to aisle 232, as described further below, and/or to allow each subunit 213 to move independently along corresponding tracks 214.

In joined configuration 260, as shown in FIG. 5, subunits 213 are releasably coupled. The subunits can be mechanically linked, magnetically adhered, fastened, and/or connected in any effective manner. Coupling of subunits 213 can include operative connection of actuators 222 of the subunits, such that a user is able to use the actuator of one subunit to disengage brake mechanisms 220 of both subunits. Such operative connection may simplify movement of container 112 in joined configuration 260, allowing a single user to release and propel the container with one hand, during manual operation.

In some examples, one of the subunits can function as a primary unit and the other as a secondary unit. In joined configuration 260 of such an example, brake mechanism 220 of the secondary unit can be disengaged such that the secondary unit remains in a mobile mode. Brake mechanism 220 of the primary unit can provide braking for both the primary unit and connected secondary unit. In some such examples, when the secondary unit will be separated from the primary unit only for brief periods, to provide walking access, the secondary unit may or may not use an independent brake mechanism.

Subunits 213 can be mechanically coupled in joined configuration 260, for instance by a hook and post mechanism that includes a quick-release handle. The handle and/or other release can be configured for access from the front, back, and/or near the center of the subunits. Such coupling may provide a safe, robust connection that is resistant to accidental disconnection while allowing easy access and release. Alternatively, subunits 213 can be coupled such that pulling sharply in opposite directions separates the subunits, for instance as can be effectuated with magnetic, snap-fit, and hook and loop fasteners. Such easy release may allow quick separation and reconnection of the subunits and minimize disruptions to service.

In some examples, subunits 213 can be configured to operate independently without a joined configuration. Such examples may be preferred when each subunit has a separate complement of service items, for instance when one subunit includes items for a complementary beverage service and the other subunit includes electronic items such as headphones for purchase.

Figure 8:
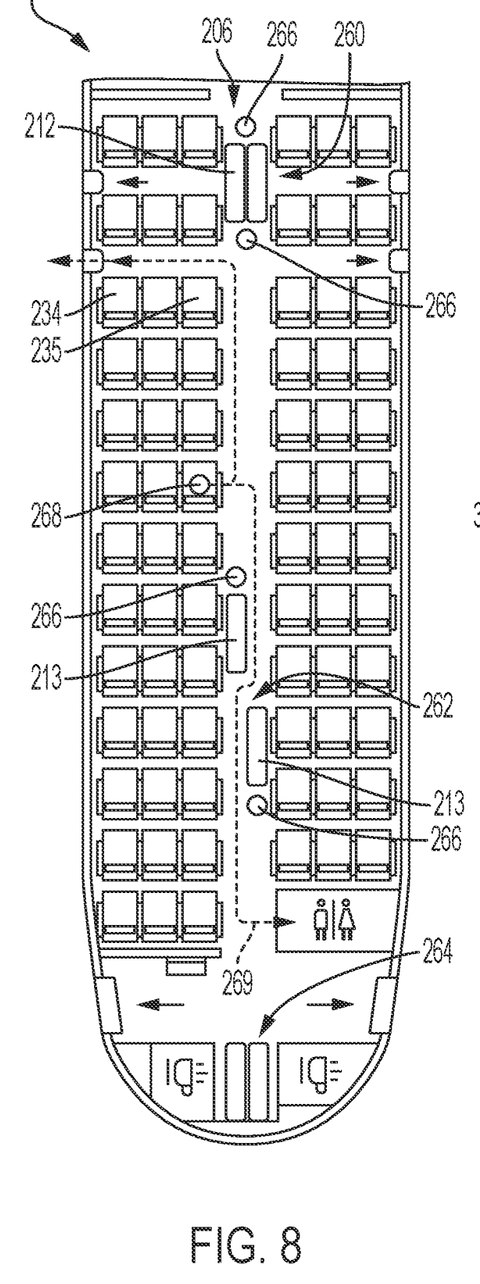
FIG. 8 is a schematic diagram of the passenger compartment of FIG. 4.

FIG. 8 is a schematic view of passenger compartment 206 of aircraft 202. Two attendants 266 are depicted operating serving system 210. Container 212 of the serving system is depicted in joined configuration 260, separated configuration 262, and a stored configuration 264. In joined configuration 260, attendants 266 can use container 212 in a similar manner to a traditional galley cart, proceeding along aisle 232 to deliver service items to each row of seats 234.

Aisle 232 is obstructed while container 212 is in joined configuration 260, but the container can be transitioned to separated configuration 262 to allow walking access. Each subunit is suspended over half of aisle 232, providing walking access between the subunit and adjacent seats 235 on an opposing side of the aisle. For example, a passenger 268 desiring access to the restroom can proceed along path 269 between subunits 213 of the container. Access to emergency exits and/or other areas of aircraft 202 can be similarly achieved by both passengers and crew. Transition to separated configuration 262 can be accomplished by one of attendants 266 moving a limited distance down aisle 232, and service can continue with container 212 in the separated configuration.

When not in use, container 212 can be returned to storage configuration 264 in the galley. The container can be stored in a closet, cupboard, or other dedicated space. Tracks 214 can be configured to extend into the storage space, such that container 212 remains suspended from the tracks in storage configuration 264.

C. Illustrative Single Side Suspended Serving System

Figure 7:
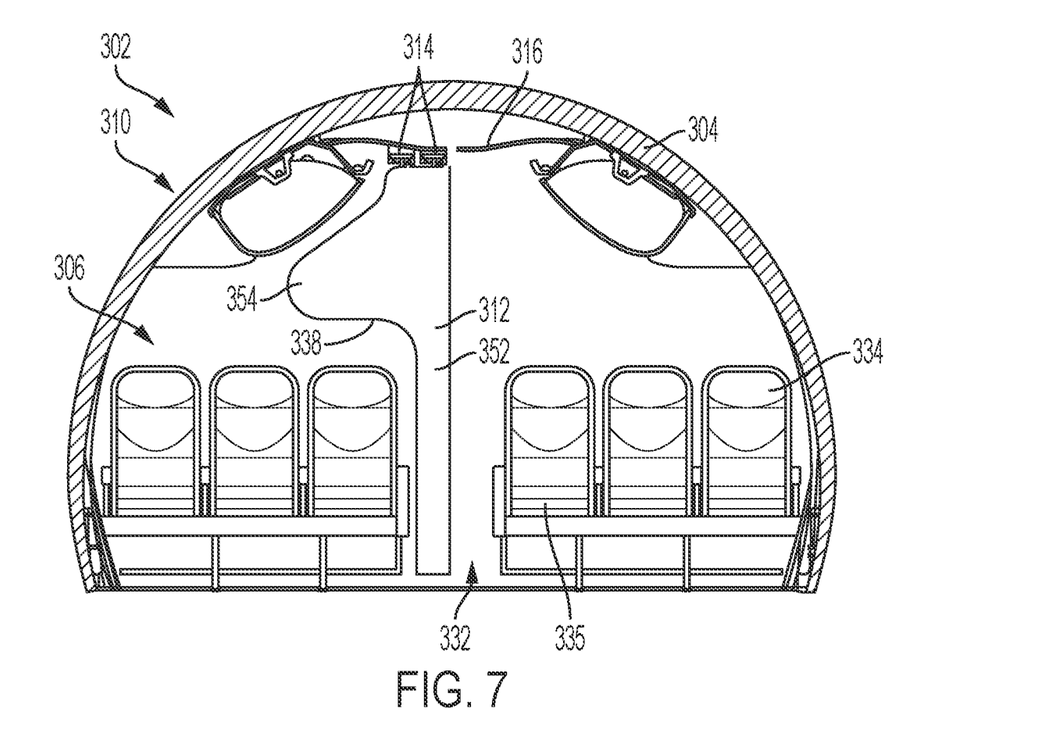
FIG. 7 is a cross-sectional view of another aircraft passenger compartment, including an illustrative suspended serving system.
Figure 9:
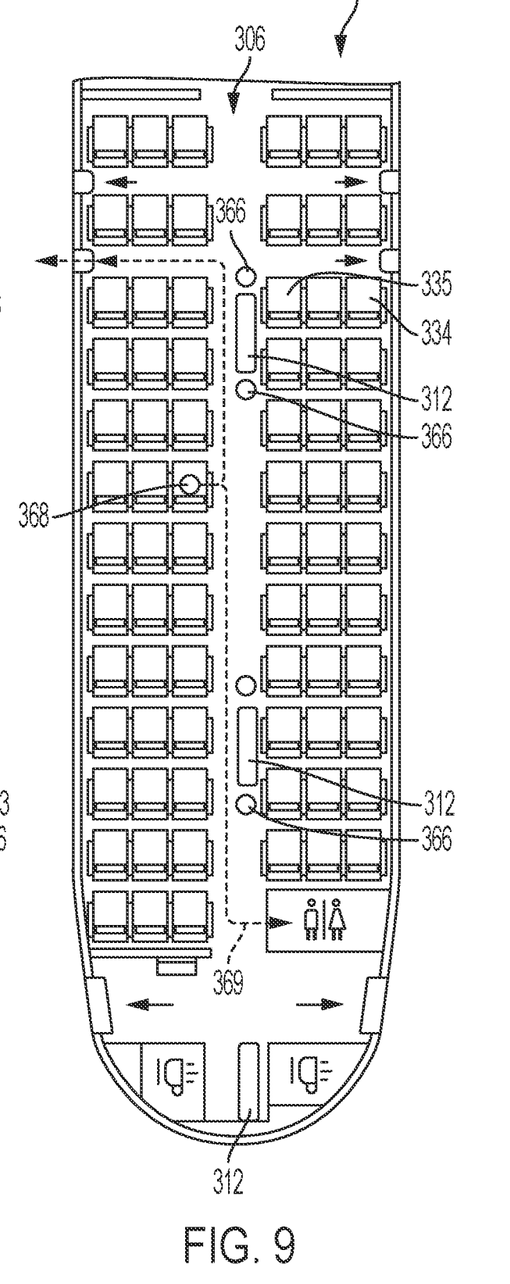
FIG. 9 is a schematic diagram of the aircraft passenger compartment of FIG. 7.

As shown in FIGS. 7 and 9, this section describes an illustrative suspended serving system 310. Serving system 310 is an example of serving system 10, described above, and is mounted in an aircraft 302. FIG. 4 is a cross-sectional view of a fuselage 304 of aircraft 302, showing the interior of a passenger compartment 306. Serving system 310 is mounted to a ceiling 316 of the passenger compartment.

Serving system 310 includes a container 312, which is similar to a subunit 213 of container 212 of serving system 210. Container 312 is suspended from a pair of tracks 314, and movable along the pair of tracks. Tracks 314 are fastened to ceiling 316 over an aisle 332, between rows of seats 334. The tracks extend along the aisle, parallel to a longitudinal axis of fuselage 304. Container 312 includes a main body portion 352 and a side portion 354. The side portion extends laterally out from main body portion 352, over an adjacent seat 335 of seats 334.

Side portion 354 of container 312 includes a bottom wall 338. The container is sized, shaped, and suspended such that bottom wall 338 is disposed above adjacent seats 335. As described above in reference to containers 112 and 212, serving system 310 can be configured to provide sufficient head space for a selected range of passengers and/or all passengers.

Main body portion 352 of container 312 extends most of the height of passenger compartment 306. The main body portion extends down past bottom wall 338 of side portion 354, into aisle 332. Main body portion 352 occupies approximately half of aisle 332, leaving the remainder of the aisle clear for walking access. In some examples, main body portion 352 can occupy less or more than half the aisle. The extent of the main body portion may be selected to maximize storage capacity of container 312 while leaving sufficient clearance in aisle 332 for passenger or crew to pass by.

FIG. 9 is a schematic view of passenger compartment 306 of aircraft 302. Two attendants 366 are depicted operating serving system 310 in a similar manner to a traditional galley cart, proceeding along aisle 332 to deliver service items to each row of seats 334. Aisle 332 is not obstructed by container 312. The container is suspended over only half of the aisle, providing walking access during normal service. For example, a passenger 368 desiring access to the restroom can proceed along path 369 between container 312 and rows of seats 334 on the opposite side of aisle 332. Attendants 366 can continue service without interruption. Access to emergency exits and/or other areas of aircraft 302 is similarly available to both passengers and crew.

D. Illustrative Aircraft

Figure 10:
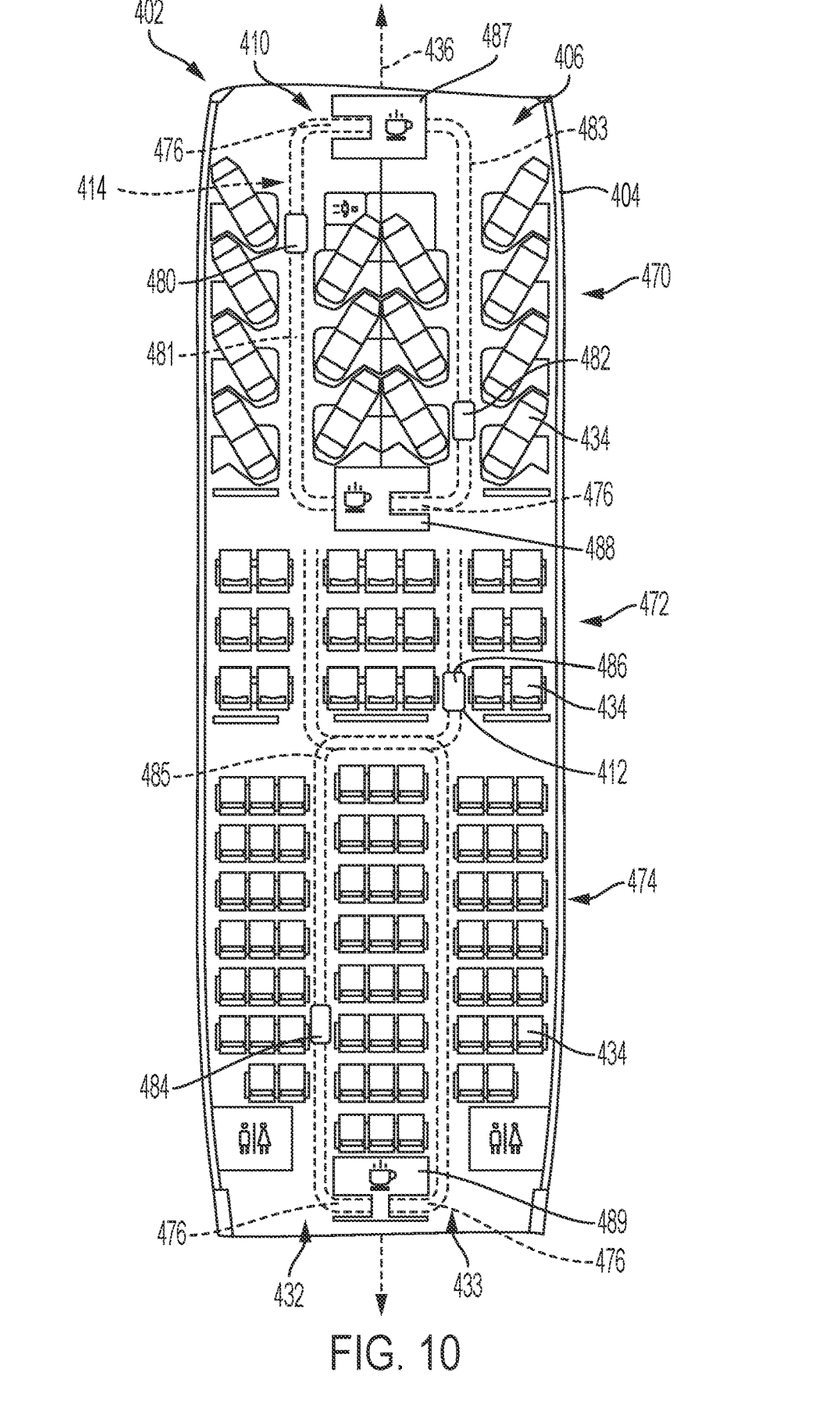
FIG. 10 is a schematic diagram of another aircraft passenger compartment, including an illustrative suspended serving system.

As shown in FIG. 10, this section describes an illustrative aircraft 402. The aircraft includes a fuselage 404 with a passenger compartment 406. In the compartment is mounted a suspended serving system 410, which is an example of suspended serving system 10, described above. Serving system 410 can be a unitary serving system similar to serving system 110, a divisible serving system similar to serving system 210, a single side serving system similar to serving system 310, and/or can include any combination of features and elements of the illustrative serving systems described above.

FIG. 10 is a schematic diagram of passenger compartment 406 of aircraft 402. The passenger compartment includes a left-hand aisle 432 and a right-hand aisle 433, and is divided into three service zones, first class zone 470, business class zone 472, and economy zone 474. Serving system 410 is configured to provide service to rows of seats 434 in all three service zones.

Serving system 410 includes four containers 412, each having an assigned storage bay 476. The containers are suspended from multiple discrete sections of parallel tracks 414. A first container 480, of the four containers, is suspended from a first section 481 of tracks. A second container 482, of the four containers, is suspended from a second section 483 of tracks. Each of the first and second sections 481, 483 extends through first class 470 between a forward galley 487 and a mid galley 488, along left-hand aisle 432 and right-hand aisle 433 respectively. A third container 484 and a fourth container 486, of the four containers, are suspended from a third section 485 of tracks. The third section extends from an aft galley 489, through both business class 472 and economy 474, and along left-hand aisle 432 and right-hand aisle 433.

Serving system 410 can be customized to fit the floor plan and/or service needs of a specific aircraft. The system can include any useful number of containers 412 and any number and layout of discrete and/or connected sections of tracks 14. In some examples, design of the serving system may be included in a design process for the aircraft.

First and second containers 480, 482 are configured for service in first class zone 470. The first and second containers can match, in order that both first class seats adjacent left-hand aisle 432 and first class seats adjacent right-hand aisle 433 receive the same service. The containers can include features specific to first class service. For example, the first and second containers can include labeled meal storage for pre-ordered meals or a storage rack for champagne flutes.

Third and fourth containers 484, 486 can each be configured for service in both business class zone 472 and economy zone 474. The two containers can be specialized, that is the two containers can be configured to transport different selected sets of service items. For example, third container 484 can be configured to transport beverage service items and fourth container 486 can be configured to transport meal service items. Such a configuration may allow efficient customization of internal storage features and/or integrated systems such as heating and cooling. In some examples, service in business class may be sufficiently different from service in economy that a more efficient configuration of serving system 410 includes configuring third container 484 for service in business class zone 472 and configuring fourth container 486 for service in economy zone 474.

Tracks 414 are positioned to provide access for containers 412 to all rows of seats 434, and for each container to return to the assigned storage bay 476 in one of galleys 487, 488, or 489. Along aisles 432 and 433, tracks 414 extend parallel to a longitudinal axis 436 of fuselage 404. Tracks 414 also curve and extend transversely across passenger compartment 406, perpendicular to longitudinal axis 436. The curved and transverse tracks of first and second sections 481 and 483 allow first and second containers 480 and 482 to be turned into assigned storage bays 476 in forward galley 487 and mid galley 488. The curved and transverse tracks of third section 485 allow third and fourth containers 484 and 486 to cross between left-hand aisle 432 and right-hand aisle 433. Such range of movement for the third and fourth containers can allow each container to all rows of seats in business class zone 472 and economy zone 474, which in turn can allow specialization of the selection of service items stored in each container, as discussed above.

Storage bays 476 are configured for safe storage of containers 412, when the containers are not in use. In addition to the braking mechanism of each container, each storage bay can include one or more additional brakes and/or mechanisms to secure a container. For example, neodymium plate magnets mounted in each storage bay 476 and container 412 can be positioned to effectively lock the container in place when maneuvered into the storage bay. While the braking mechanism of each container can be sufficient, additional safety measures may be preferred when a container is unattended in storage.

Storage bays 476 can include additional features configured to engage systems or features of containers 412. For example, one or more storage bays can include a wired and/or wireless electrical connection. The storage bay can be configured to charge electrical systems of a stored container 412, such as refrigeration or heating. For another example, one or more storage bays can include a wired and/or wireless data connection. The storage bay can be configured to transfer data to a computer system of a galley or of aircraft 402, from a computer system on a container 412 such as a point of sale or inventory management system. For another example, one or more storage bays can include supplies of heated or cooled fluid to a reservoir of a stored container 412 for passive refrigeration or heating.

E. Illustrative Method of Service

Figure 11:
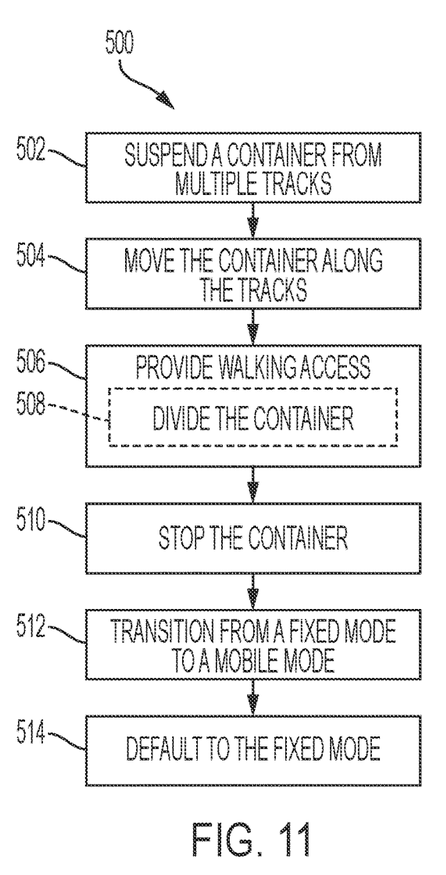
FIG. 11 is a flowchart depicting steps of an illustrative method of service.

This section describes steps of an illustrative method for aircraft cabin service; see FIG. 11. Aspects of suspended serving systems described above can be utilized in the method steps described below. Where appropriate, reference may be made to components and systems that can be used in carrying out each step. These references are for illustration and are not intended to limit the possible ways of carrying out any particular step of the method.

FIG. 11 is a flowchart illustrating steps performed in an illustrative method and may not recite the complete process or all steps of the method. Although various steps of method 500 are described below and depicted in FIG. 11, the steps need not necessarily all be performed, and in some cases can be performed simultaneously or in a different order than the order shown.

At step 502, the method includes suspending a mobile container from multiple tracks. The container can be unitary or can include subunits, each subunit being independently suspended from multiple tracks. The tracks can be mounted on a ceiling above the aisle of a passenger compartment of a vehicle, such as an aircraft. Step 502 of the method can be carried out during construction of the vehicle, during preparation for vehicle travel, and/or during maintenance of the vehicle.

Step 504 of the method includes moving the container along the tracks. The container can contain service items and can be moved along the tracks to deliver the service items to selected rows of seats in the passenger compartment. The mobile container can be configured for manual movement by a service attendant. Moving the mobile container along the tracks can include moving a main body portion down the aisle and moving one or more side portions over the head space of rows of seats adjacent the aisle.

At step 506, the method includes providing walking access between the mobile container and rows of seats on an opposing side of the aisle. Access can be provided passively, by the configuration of the mobile container. For example, the mobile container can occupy only half of the aisle. The method also includes an optional step 508, which includes dividing the mobile container to provide walking access. The container can be divided into first and second subunits, each subunit being independently movable along multiple tracks. Each subunit can be suspended over half of the aisle, such that separating the subunits along the aisle provides walking access between the subunit and rows of seats on the opposing side of the aisle.

Step 510 of the method includes stopping the container. The container can be stopped by releasing an actuator, the actuator being configured to engage and disengage a brake mechanism of the container with the tracks. Releasing the actuator can engage the brake mechanism and thereby place the container in a fixed mode. In the fixed mode, the mobile container is prevented from moving along the tracks. A service attendant can release the actuator to stop the container adjacent a row of seats, in order to provide service to those seats. The container can remain in the fixed mode until the next step of the method, which can be performed once service for one or more rows of seats is concluded.

At step 512, the method includes transitioning the container from the fixed mode to a mobile mode. In the mobile mode, the container is free to move along the tracks. The service attendant can use the actuator to disengage the brake mechanism from the track or tracks and thereby allow the container to be moved along the tracks. Steps 510 and 512 can be repeated during the course of service, as the service attendant delivers service items to each of the selected rows of seats along the aisle.

Step 514 of the method includes defaulting to maintaining the mobile container in the fixed mode. The actuator and the brake mechanism can be configured such that the mobile container returns to the fixed mode unless the actuator is used. When the actuator is released, the brake mechanism can engage and return the mobile container to the fixed mode. The mobile container can therefore be restrained unless intentionally moved, improving safety in the moving environment of the vehicle.

F. Illustrative Aircraft and Associated Method

Figure 12:
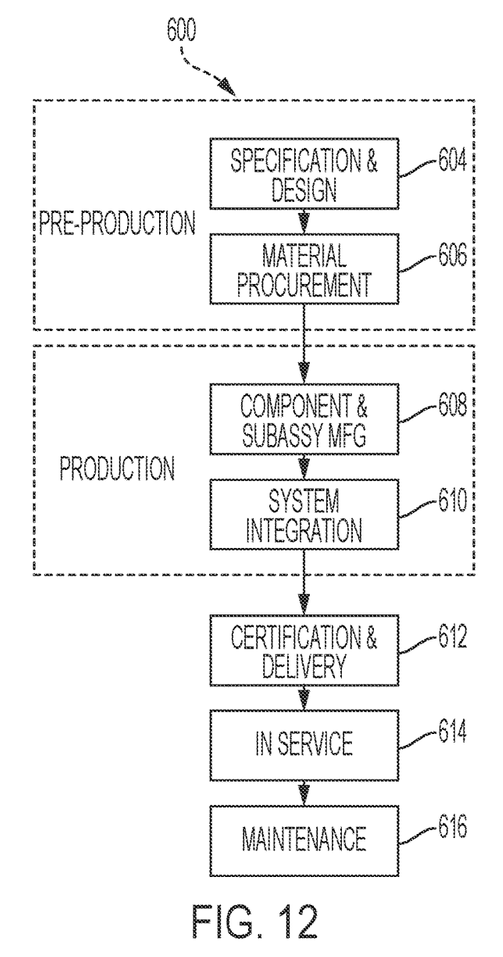
FIG. 12 is a flowchart depicting steps of an illustrative aircraft manufacturing and service method.
Figure 13:
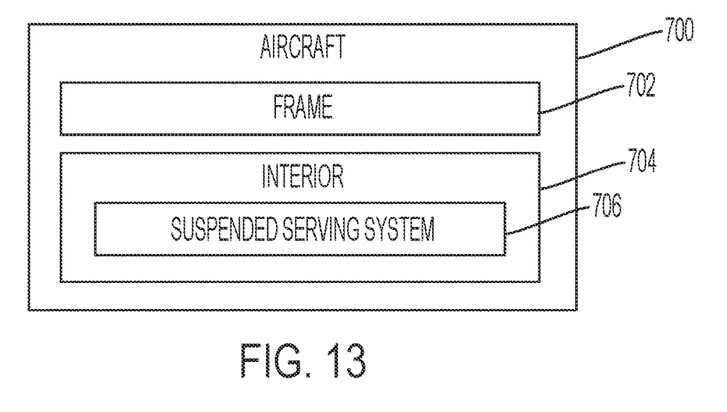
FIG. 13 is a schematic diagram of an illustrative aircraft.

Examples disclosed herein can be described in the context of an illustrative aircraft manufacturing and service method 600 (see FIG. 12) and an illustrative aircraft 700 (see FIG. 13). Method 600 includes a plurality of processes, stages, or phases. During pre-production, method 600 can include a specification and design phase 604 of aircraft 700 and a material procurement phase 606. During production, a component and subassembly manufacturing phase 608 and a system integration phase 610 of aircraft 700 can take place. Thereafter, aircraft 700 can go through a certification and delivery phase 612 to be placed into in-service phase 614. While in service (e.g., by an operator), aircraft 700 can be scheduled for routine maintenance and service 616 (which can also include modification, reconfiguration, refurbishment, and so on of one or more systems of aircraft 700). While the examples described herein relate generally to operational use during in-service phase 614 of aircraft 700, they can be practiced at other stages of method 600.

Each of the processes of method 600 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

As shown in FIG. 13, aircraft 700 produced by illustrative method 600 can include a frame 702 and an interior 704 with a suspended serving system 706. Although an aerospace example is shown, the principles disclosed herein can be applied to other industries, such as the automotive industry, rail transport industry, and nautical engineering industry. Accordingly, in addition to aircraft 700, the principles disclosed herein can apply to other vehicles, e.g., land vehicles, marine vehicles, etc. In any of these cases, interior 704 can include a suspended serving system according to the teachings of the present disclosure.

Suspended serving systems and methods of passenger compartment service shown or described herein can be employed during any one or more of the stages of the manufacturing and service method 600. For example, components or subassemblies corresponding to component and subassembly manufacturing phase 608 can be fabricated or manufactured in a manner similar to components or subassemblies produced while aircraft 700 is operating during in-service phase 614. Also, one or more examples of the systems, methods, or combinations thereof can be utilized during production phases 608 and 610, for example, by substantially expediting assembly of or reducing the cost of aircraft 700. Similarly, one or more examples of the apparatus or method realizations, or a combination thereof, can be utilized, for example and without limitation, while aircraft 700 is in service phase 614 and/or during maintenance and service phase 616.

Illustrative Combinations and Additional Examples

This section describes additional aspects and features of illustrative suspended serving systems, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A. An aircraft comprising:
    a fuselage having a longitudinal axis and a passenger compartment having a floor and a ceiling,
    rows of seats fixed to the floor adjacent an aisle, and
    a mobile container suspended from multiple tracks mounted on the ceiling over the aisle.

A1. The aircraft of A, wherein the tracks are parallel to the longitudinal axis of the fuselage.

A2. The aircraft of either A or A1, wherein the tracks are perpendicular to the longitudinal axis of the fuselage.

A3. The aircraft of any of A-A2, wherein the mobile container has a fixed mode and a mobile mode, and further comprising:
    an actuator enabling transition of the mobile container between the fixed mode and the mobile mode.

A4. The aircraft of A3, wherein the actuator is configured for manual transition between the fixed mode and the mobile mode.

A5. The aircraft of either A3 or A4, wherein the fixed mode is a default mode.

A6. The aircraft of any of A-A5, wherein the seats have a height, the container having a bottom wall above the height of the seats.

A7. The aircraft of any of A-A6, wherein the entire mobile container is directly above the aisle.

A8. The aircraft of any of A-A7, wherein the mobile container has a side portion extending over one or more of the seats.

A9. The aircraft of any of A-A8, wherein the container is divisible into first and second subunits, each subunit being independently moveable along multiple tracks mounted on the ceiling parallel to the longitudinal axis of the fuselage.

A10. The aircraft of A9, wherein each of the first and second subunits is suspended over half of the aisle providing walking access between the subunit and rows of seats on an opposing side of the aisle.

A11. The aircraft of either A9 or A10, wherein each subunit has a side portion extending over one or more of the seats.

A12. The aircraft of any of A9-A11, wherein each subunit extends most of the distance between the ceiling and the floor.

B. An aircraft comprising:
a fuselage having a longitudinal axis and a passenger compartment having a floor and a ceiling,
rows of seats fixed to the floor adjacent an aisle, and
a mobile container suspended from one or more tracks mounted on the ceiling over the aisle, wherein the mobile container has a side portion extending over one or more of the seats.

B1. The aircraft of B, wherein mobile container is suspended from at least two parallel tracks.

C. A serving system for carrying service items down an aisle adjacent rows of seats, comprising:
multiple tracks configured for mounting on a ceiling above the aisle,
a mobile container configured for suspension from the multiple tracks, wherein the mobile container is moveable along the aisle to deliver service items to the rows of seats.

D. A method of delivering service items to rows of seats adjacent an aisle in a passenger compartment, comprising:
suspending a mobile container from multiple tracks mounted on a ceiling above the aisle of the passenger compartment, and
moving the mobile container along the multiple tracks to deliver service items to selected rows of seats.

D1. The method of D, further comprising:
providing walking access between the mobile container and rows of seats on an opposing side of the aisle.

D2. The method of either D or D1, wherein a head space is defined above rows of seats, the moving step includes the step of:
moving a portion of the container over the head space.

D3. The method of any of D-D2, further comprising:
dividing the container into first and second subunits, each subunit being independently moveable along multiple tracks mounted on the ceiling parallel to a longitudinal axis of the passenger compartment, each of the first and second subunits being suspended over half of the aisle providing walking access between the subunit and rows of seats on an opposing side of the aisle.

D4. The method of any of D-D3, further comprising:
stopping the location of the container along the tracks by releasing an actuator.

D5. The method of any of D-D4, wherein the mobile container has a fixed mode in which the mobile container is prevented from moving along the tracks, and a mobile mode in which the mobile container is free to move along the tracks, the method further comprising:
transitioning the mobile container from the fixed mode to the mobile mode D6. The method of D5, further comprising:
defaulting to maintaining the mobile container in the fixed mode.

E. A vehicle comprising:
a passenger compartment having a floor and a ceiling,
a plurality of seats fixed to the floor adjacent a pathway, and
a mobile container suspended from one or more tracks mounted on the ceiling over the pathway, wherein the mobile container traverses the one or more tracks to serve a passenger.

E1. The vehicle of E, wherein the vehicle is one of (a) a train, (b) a bus, (c) a ship, (d) a spacecraft, (e) an aircraft.

F. A serving system for carrying service items through a passenger compartment, comprising:
multiple tracks configured for mounting on a ceiling,
a mobile container configured for suspension from the multiple tracks, wherein the mobile container is moveable along the tracks to deliver service items to a passenger.

Advantages, Features, and Benefits

The different examples of the suspended serving system described herein provide several advantages over known solutions for transporting service items down an aisle between rows of seats. For example, illustrative examples described herein allow free movement of passengers and attendants down the aisle, with minimal disruption to service.

Additionally, and among other benefits, illustrative examples described herein utilize additional space over seats to improve storage capacity.

Additionally, and among other benefits, illustrative examples described herein prevent undesirable movement by defaulting a container to a secured mode when not actively being moved.

Additionally, and among other benefits, illustrative examples described herein allow a container to be secured vertically as well as horizontally to prevent undesirable movement.

No known system or device can perform these functions, particularly with simple, light, and easily manufactured components. Thus, the illustrative examples described herein are particularly useful for galley service on commercial aircraft. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. An aircraft, comprising:
a fuselage having a longitudinal axis and a passenger compartment having a floor and a ceiling,
rows of seats fixed to the floor and adjacent an aisle, and
a mobile container suspended from multiple tracks mounted on the ceiling over the aisle, the container being divisible into first and second subunits, each subunit being independently moveable along the tracks, wherein the first and second subunits have a joined configuration and a separated configuration, the mobile container being movable along the tracks in the joined configuration.

2. The aircraft of claim 1, wherein each of the first and second subunits is suspended over half of the aisle providing walking access between the subunit and the rows of seats on an opposing side of the aisle.

3. The aircraft of claim 1, wherein each subunit has a side portion extending over one or more of the seats.

4. The aircraft of claim 1, wherein each subunit extends most of a distance between the ceiling and the floor.

5. The aircraft of claim 1, wherein each subunit has a side portion extending over one or more of the seats and a main body portion extending most of a distance between the ceiling and the floor.

6. The aircraft of claim 5, wherein the side portion includes a planar bottom wall and an upper curve to provide clearance from overhead bins of the passenger compartment, and wherein the main body portion is rectangular.

7. The aircraft of claim 1, wherein each subunit includes an independent brake mechanism.

8. The aircraft of claim 1, wherein each subunit is suspended from two tracks mounted at separate locations on the ceiling.

9. The aircraft of claim 1, wherein the mobile container includes a releasable coupling between the first subunit and the second subunit.

10. The aircraft of claim 9, wherein each subunit includes a brake mechanism and an associated actuator, and the releasable coupling operatively connects the actuators of the first and second subunits.

11. A method of delivering service items to rows of seats adjacent an aisle in a passenger compartment, comprising:
suspending a mobile container from multiple tracks mounted on a ceiling above the aisle of the passenger compartment,
moving the mobile container along the multiple tracks to deliver service items to selected rows of seats, and
dividing the mobile container into first and second subunits to provide walking access between each subunit and the rows of seats on an opposing side of the aisle,
wherein dividing the mobile container includes releasing a coupling between the first subunit and the second subunit, and moving the first subunit away from the second subunit along the tracks.

12. The method of claim 11, further comprising:
moving each subunit independently along the multiple tracks.

13. The method of claim 11, further comprising:
stopping the container at a location along the tracks by releasing an actuator.

14. The method of claim 11, wherein releasing the coupling includes disconnecting an actuator of a brake mechanism of the first subunit from an actuator of a brake mechanism of the second subunit.

15. The method of claim 11, further comprising rejoining the coupling and resuming delivery of service items with the mobile container.

16. A vehicle, comprising:
a passenger compartment having a floor and a ceiling,
a plurality of seats fixed to the floor adjacent an aisle, and
a first mobile container suspended from one or more tracks mounted on the ceiling over the aisle, the first mobile container being suspended over half of the aisle, and allowing walking access between the first mobile container and adjacent seats on an opposing side of the aisle, and
a second mobile container suspended from one or more tracks mounted on the ceiling over the aisle,
wherein the first and second mobile containers have a joined configuration and a separated configuration, the first and second mobile containers being movable together along the tracks in the joined configuration and each of the first and second mobile containers being independently movable along the corresponding tracks in the separated configuration.

17. The vehicle of claim 16, wherein the first mobile container has a side portion extending over one or more of the seats.

18. The vehicle of claim 16, wherein each of the first and second mobile containers includes an independent brake mechanism.

19. The vehicle of claim 16, further including a releasable coupling between the first and second mobile containers.

20. The vehicle of claim 19, wherein each of the first and second mobile containers includes a brake mechanism and an associated actuator, and the releasable coupling operatively connects the actuators of the first and second mobile containers.

* * * * *